Patented Feb. 19, 1952

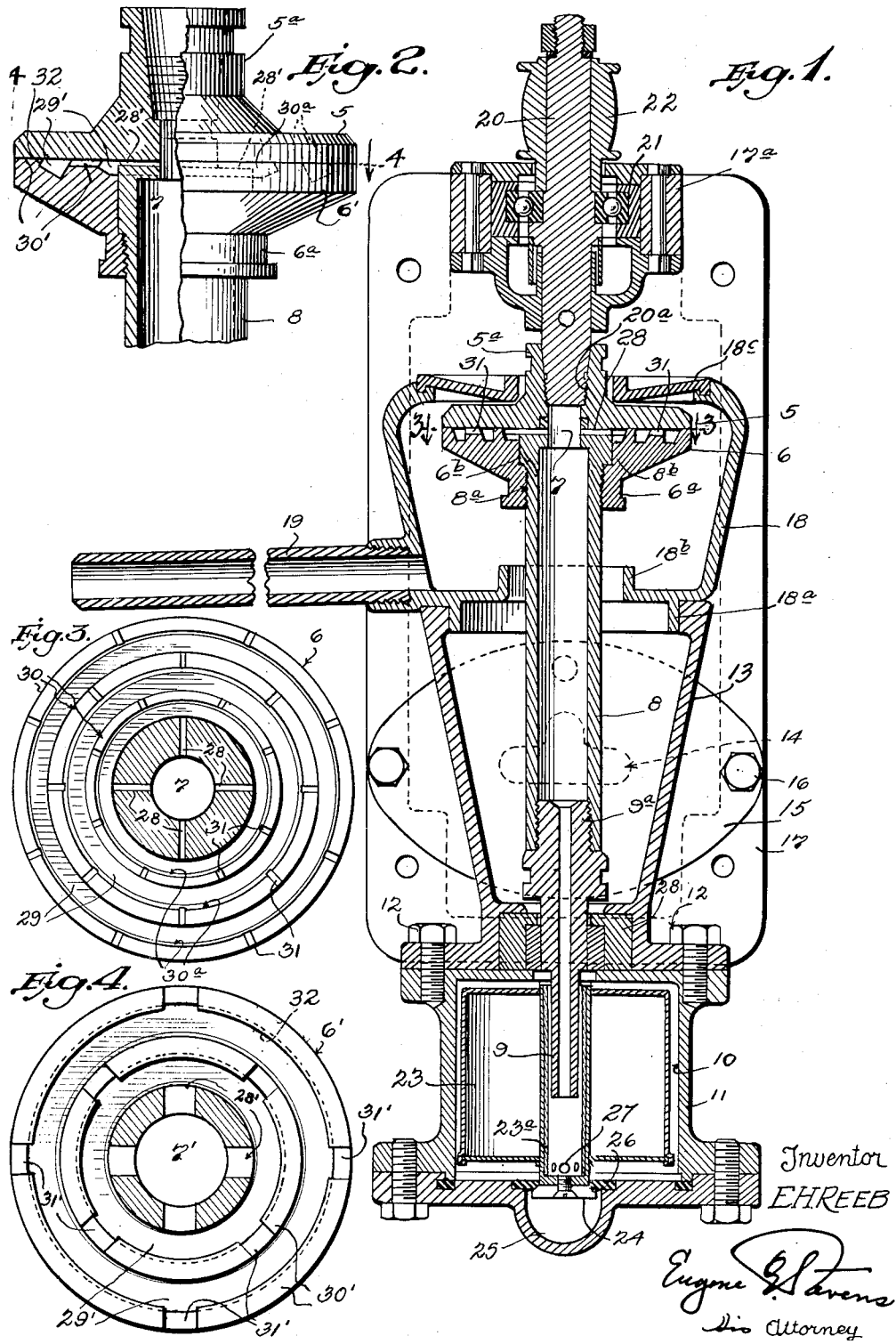

2,586,258

UNITED STATES PATENT OFFICE 2,586,258

HOMOGENIZING APPARATUS

Eugene H. Reeb, Philadelphia, Pa., assignor to Star Metal Manufacturing Company, Philadelphia, Pa., a partnership comprising Abraham S. Levin and Sarah Levin Application March 7, 1946, Serial No. 652,739

10 Claims. (Cl. 259—96)

My invention relates to apparatus for homogenizing fatty component-incorporating liquids with particular reference to the production by reconstitution of dairy products such as milk, cream, whipping cream, etc. It is to be understood, however, that my basic concept lends itself to a multitude of other uses, such as the making of ice cream mix, as well as various products such as hair tonics, medicines for internal consumption, etc.

It is a well known fact that the production of different types of emulsions calls for widely different amounts of mechanical treatment. For instance, in the dairy field, the reconstitution, or synthetic production, of milk necessitates a much more extended and violent mechanical treatment to produce a properly emulsified product than is the case when the substance to be turned out is, for example, whipping cream, ice cream mix, or involves different elements of greater viscosity, etc. In the latter two instances, the product is a rather thick one as compared to milk, and is characterized by coated fat globules of much greater size than those present in milk. To reduce or increase intensity of mechanical treatment by changing the centrifugal speed of the homogenizer, which ordinarily runs from 20,000 to 25,000 R. P. M. involves virtually insurmountable practical difficulties.

In addition, the fat globule-breaking, coating, etc., necessary to stable emulsion production, can only be achieved at very high speeds, so resort to speed change of the centrifugally driven unit would not adapt the apparatus for the making of emulsions of very widely different physical characteristics.

It is, therefore, one of the primary objects of the present invention to provide a centrifugally driven homogenizing unit which incorporates readily interchangeable elements having different product activating formations, and/or which are of greater or lesser area according to the character of emulsified product to be turned out, thus obviating any necessity for change in the centrifugal speed of the driven unit.

The invention achieves highly efficient fat globule breakage and coating of the same through initial constriction of the product, followed by impact action. This impact action is both accompanied and followed by product expansion while it is subjected to a friction-induced kneading action. This recited cycle is preferably repeated, one or more times with progressively increased action except as to the product constriction phase before the final emulsion is discharged.

It is also an object to provide apparatus which involves means for confining the product within successive friction surfaced areas driven at high speed and permitting minor quantities only of the product to escape from one area to another at a time.

Still further, I aim to provide means for efficient homogenization of a fat globule-incorporating product which produces a combination of kneading action for coating purposes, impact break-down of the globules, in combination with means, preferably in the multiple, for effecting constriction and expansion of the product.

Still another object of the invention is to provide a centrifugally driven unit which is inexpensive to manufacture, highly efficient in practical use, and which can be readily cleaned.

Other objects and advantages of the invention will be apparent to those skilled in the art from a reading of the following detailed description of a preferred example, which is shown in the accompanying drawings.

In the drawings, wherein the same reference characters have been used to designate the same parts throughout the several views:

Fig. 1 is a vertical sectional view through an emulsifier unit with which my novel radially discharging homogenizing or emulsifying means is associated;

Fig. 2 shows a modification of the lower emulsifying disk, the view being an enlarged vertical section of same in assembly with the upper disk of Fig. 1;

Fig. 3 is a sectional view taken on the line 3—3 of Fig. 1, illustrating the surface formation of the lower disk member of my unit shown in Fig. 1; and Fig. 4 is a sectional view taken on the line 4—4 of the modified disk assembly of Fig. 2, showing the active surface of the lower disk member of the unit.

Referring to the drawings by reference characters, the illustrated embodiment of the novel radially discharging homogenizing unit which is the subject of my present invention, takes the form of concentrically and contiguously disposed upper and lower disk members 5, 6, respectively, which are adapted to be driven at high speeds, as a unit, about their axes.

In the unit 5, 6, as herein shown, inlet of the fluid to be acted upon by disk-provided passage means to be hereinafter described, is had through the hub 6a of the lower disk 6, it being noted that the structure provides a medial fluid receiving chamber 7, as indicated in Fig. 1.

As herein disclosed, my novel radially discharging emulsifying or homogenizing unit 5, 6, is illustrated as associated with a known type of emulsifier or homogenizer unit, which is on the market and is described and claimed in the copending application of Abraham S. Levin, J. Cecil Rhodes and myself, Serial Number 583,438, filed March 19, 1945, now abandoned.

As in the application referred to, the upper disk 5 is formed integral with an elongated vertically disposed bowl 8. The lower disk 6 is adapted to be slipped onto said bowl 8 from the lower end thereof and screwed as at 8a, into snug contact with the bowl-provided shoulder 8b, which is located below the bowl-carried disk 5. The removable disk 6 has a recess 6b receiving the shoulder 8b, as shown in Fig. 1.

In the commercial apparatus referred to, the lower end of the bowl 8 terminates in a diametrically reduced suction tube 9 whose rear end 9a is threaded into the bowl, as shown. This suction tube 9 extends into a float controlled fluid supply chamber 10, provided in a casing section 11. The casing section 11 is bolted as at 12, to the base flange of a superposed casing member 13.

Casing member 13 is carried by a projection 14 extending from an oval plate 15 which is bolted as at 16 to a rectangular base 17.

The open circular top of the casing 13 receives the circumferential base flange 18a of an emulsion collecting casing section 18, which has the outlet passage 19, and the upstanding base collar 18b disposed about the bowl 8. A removable annular closure 18c is provided for the emulsion collecting casing section 18 and is disposed about the hub portion 5a of the upper disk member 5, as illustrated in Fig. 1.

As will be understood, casing 18 encloses the centrifugally driven disk unit 5, 6, and receives emulsion therefrom. The action of unit 5, 6 will be particularized later on herein.

A drive shaft 20 is journalled in bearing 21, carried by a portion 17a of said base 17. The lower end of the drive shaft 20, is threaded as at 20a, into the hub 5a of the upper disk member 5. The lower end of drive shaft 20 provides a seal for the top of the mixture receiving chamber 7, which, as stated, is disposed concentrically of the disks 5, 6. A drive pulley 22 is fast on the drive shaft 20 and is adapted to be driven by a belt or the like.

The commercial emulsifier illustrated, includes an annular float 23 in the chamber 10, and the medial hole in said float terminates in a tube extension 23a, having a valve 24 disposed in the bottom inlet supply chamber 25. Valve 24 works in conjunction with a seat 26 separating the chambers 25, 10 for controlling the inlet of fluids to the chamber 10.

The tubular extension 23a of the float has apertures 27 so as to admit fluid from the chamber 10 into the central hole of the float, this being necessary because the suction tube 9 extends into the central float hole. The level of fluid in the central hole of float 23, will, of course, be the same as the level of fluid in the supply chamber 10.

From the foregoing, it will be apparent that the assembly of disks 5, 6, bowl 8, and suction tube 9, are driven from pulley 22 by drive shaft 20. The drive of the machine will preferably be at the rate of 20,000 to 25,000 R. P. M.

The mixture of fat, liquids and solids in chamber 10 will be sucked into the tube 9 and from thence to the elongated bowl 8, due to the partial vacuum produced by the high speed rotation of the bowl and tube assembly 8, 9. Radial exhaustion of air and subsequently emulsion takes place through the disk unit 5, 6, as will be presently described.

Mixture rising in the bowl 8 is clarified en route to the disk-provided discharge openings. The high speed centrifugal action of the bowl 8 causes all insoluble foreign matter to remain adherent to the bowl wall. The thus clarified mixture then passes from the disk-provided chamber 7 at the upper end of the bowl 8, radially outward through the multiple passages 28, best indicated in Figs. 2 and 3.

Referring to Figs. 1 and 3, it will be noted that the radial passages 28 leading from the disk-provided chamber 7 are in part defined by the plane lower surface of the upper disk 5.

A very important feature of the invention is the discharge of the clarified mixture from the radial holes or passages 28, against the opposed imperforate portions of the opposed ridge 30, whose upwardly and outwardly slanting inner surface 30a forms the outer wall of the inner circumferential groove 29. The drawings illustrate the lower disk 6 as provided with a plurality of radially spaced circumferential ridges 30, formed in the upper surface of the lower disk 6. The top surface of each ridge 30 is flattened, as indicated, and makes contiguous contact with the plane surface of the upper disk 5.

Each of the circumferential ridges 30 is provided with a radial series of circumferential spaced outlet openings 31, it being noted that corresponding openings 31 of adjacent ridges are staggered with reference to each other, so that the discharge from one ridge opening will bring about a violent impacting of the mixture against an imperforate ridge portion. The advantage of this action is to effect breaking down of oil globules into globules of smaller size, or even to destroy their globular form in some instances. The ridge openings 31 are provided by notching the tops of the ridges 30 so that the openings will be in part provided by and flush with the plane lower surface of the upper disk 5.

The mixture is, therefore, subjected to an initial constriction, so to speak, in its passage through the ducts 28 from the chamber 7. It is impacted violently against the opposed surface portions 30a of the inner ridge 30, resulting in oil globule breakage, as mentioned. This is accompanied and followed by what might be termed a kneading action in the innermost groove 29, due to friction produced by high speed rotation of the disk assembly 5, 6. The mixture is, of course, confined in the innermost groove 29 to the extent that it can pass to the next outer groove 29 only through the openings 31. At least that is the preferred modus operandi, rather than to permit some quantity of mixture to pass from one groove to another between the tops of the ridges 30, and the lower surface of the upper disk 5. The kneading action referred to, aside from tending to further break down oil globule formation, results in effective coating of same with liquid and other non-fatty constituents of the mixture. Also, the edges of the opening entries due to the rapid centrifugal drive of the disk structure 5, 6, effect additional breakdown of the oil globules. The upward and outward slant of the inner surfaces 30a of the ridges 30, of course, effect the directing of the mixture film toward the top ridge openings 31. And, in addition to that, there is effected a wedging or crowding of the mixture into the annular angularly constricted portion of the groove 29 which is formed by the slanting inner wall 30a and the proximate surface of the upper disk 5. This tends, not only to assist in breaking oil globules, but also is effective in achieving coating of the globules with other constituents, as mentioned hereinbefore.

Inasmuch as the grooves 29 are progressively larger as the periphery of the disk assembly 5, 6 is approached, the kneading action will be increased, and likewise more expansion of the mixture permitted. The result is that a greatly improved emulsion is ultimately discharged from the openings 31 in the outermost ridge 30, to be collected in the casing member 18, and flowed outwardly through the outlet pipe 19.

When the emulsion product to be produced is milk, an extended treatment will be required, such as will be produced by the multiple ridged and multiple grooved disk 6, as illustrated in Figs. 1 and 3. However, when the product to be produced is whipping cream, ice cream mix, or some other relatively thick-bodied emulsion, a lower disk 6', such as is illustrated in Figs. 2 and 4, will be employed, it being noted that the disk 6' involves fewer ridges 30', providing fewer grooves 29'. The openings through the ridges 30' are indicated at 31'. By selection of differently ridged and grooved lower disks, according to the product to be produced, efficient emulsion production can be achieved without changing the centrifugal speed of the disk assembly 5, 6. As heretofore indicated, the speed change would be difficult and largely ineffective.

By providing the groove and ridge formation in connection with the lower disk only, and by avoiding sharp outer edges of the ridges, it will be apparent that cleaning of the disk assembly 5, 6, will be readily accomplished.

The Figs. 2 and 4 form of the invention illustrate a further improvement which is calculated to effectually prevent passage of the emulsion between the contiguous surfaces of the upper disk 5 and the ridges 30', in case the same do not make an absolute fluid-tight fit. This phase of the invention takes the form of undercut grooves 32 in the inner peripheries of the ridges 30', adjacent the outer ends of the ridges. Thus, the rapid centrifugal drive of the disk assembly 5, 6', will result in the throwing of the emulsion into the apex of the ridge grooves rather than to the junction between the ends of the ridges 30', and the contiguous face of the upper disk 5. It will be appreciated, therefore, that the ridge grooves 32 serve an important function and this phase of the invention may, of course, be incorporated in the lower disk 6 shown in Fig. 1. The passages 31' through the ridges 30' are of a depth equal to the distance between the end of the ridge and the apex of the ridge groove 32. The circumferential groove 32 of the ridges assures of the mixture being passed from one groove 29' to the next outer groove 29' only by way of the opening 31'. Impacting of the emulsion against the wall of an outer groove 29' is assured, whereas if any emulsion passed between the ends of the ridges and the face of the upper disk 5 it would be apt to find immediate exit by way of an opposed outlet opening 31'.

Having thus described my invention, what I claim as new is:

1. A homogenizer, including in combination, a rotary closed bowl receiving and discharging the ingredients in a continuous flow, means for rotating said bowl, said bowl being closed at its upper end and providing thereat a liquid-collecting chamber, a disc fixedly and concentrically carried by the upper end of said bowl and having a substantially plane bottom surface, a second concentric disc detachably secured on said bowl adjacent its upper end and below said first mentioned disc; concentric, radially spaced flat topped circumferential ridges projecting from the upper surface of said lower disc and making substantially flat contact with the bottom surface of the upper disc, whereby said discs provide concentric radially spaced grooves about said liquid-collecting chamber, said chamber having spaced radially extending outlet passages communicating with the innermost concentric groove provided by said discs, the inner walls of said groove-providing ridges slanting upwardly and outwardly to the upper disc-engaging tops thereof, whereby to provide an annular acute-angle-defining fat globule-compressing or crushing space at the upper outer wall portions of said annular grooves, said ridges having circumferentially spaced notches cut in their upper ends, said notches being of minor depth as compared to the depth of said grooves and establishing communication from one groove to the next outer groove, the slanting inner walls of said groove-providing ridges directing the liquid upwardly to the plane of said notches, whereby to subject the liquid and its contents to extended frictional action against said walls while taking advantage of centrifugal action to prevent liquid from collecting in the bottom of said grooves.

2. A homogenizer including in combination, a rotary head comprising concentric fixedly connected upper and lower discs, means for rotating said head, a rotary closed bowl connected to the lower disc, a central annular opening in the upper disc and the top of the bowl providing a central curved - wall - providing liquid - collecting chamber, said upper disc having a substantially plane bottom surface; concentric, radially spaced relatively broad topped circumferential ridges projecting from the upper face of said lower disc and making substantially flat contact with the bottom surface of the upper disc, whereby said discs provide concentric radially spaced grooves about said liquid-collecting chamber, said chamber having spaced radially extending outlet passages communicating with the innermost concentric groove provided by said discs, the inner walls of said groove-providing ridges slanting upwardly and outwardly to the upper disc-engaging tops thereof, whereby to provide an annular acute-angle-defining fat globule-compressing or crushing space at the upper outer wall portions of said annular grooves, said ridges having circumferentially spaced notches cut in their upper ends, said notches being of minor depth as compared to the depth of said grooves and establishing communication from one groove to the next outer groove, the slanting inner walls of said groove-providing ridges directing the liquid upwardly to the plane of said notches, whereby to subject the liquid and its contents to extended fricitional action against said walls while taking advantage of centrifugal action to prevent liquid from collecting in the bottom of said grooves.

3. A homogenizer including in combination, a rotary head comprising concentric fixedly connected upper and lower discs, means for rotating said head, a rotary closed bowl connected to the lower disc, a central annular opening in the upper disc and the top of the bowl providing a central curved-wall-providing liquid-collecting chamber, said upper disc having a substantially plane bottom surface; concentric, radially spaced relatively broad topped circumferential ridges projecting from the upper face of said lower disc and making substantially flat contact with the bottom surface of the upper disc, whereby said discs provide concentric radially spaced grooves about said liquid-collecting chamber, said chamber having spaced radially extending outlet passages communicating with the innermost concentric groove provided by said discs, the inner walls of said groove-providing ridges slanting upwardly and outwardly toward the upper disc, means providing an annular acute-angle-defining fat globule-compressing or crushing space at the upper outer wall portions of said annular grooves, said ridges having circumferentially spaced notches cut in their upper ends, said notches being of minor depth as compared to the depth of said grooves and establishing communication from one groove to the next outer groove, the slanting inner walls of said groove-providing ridges directing the liquid upwardly to the plane of said notches, whereby to subject the liquid and its contents to extended frictional action against said walls while taking advantage of centrifugal action to prevent liquid from collecting in the bottom of said grooves.

4. The combination set forth in claim 1, and said notches of each ridge adding up to a fluid outlet capacity which is minor as compared to the fluid capacity of the related groove.

5. The combination set forth in claim 1, and the notches of adjacent ridges being staggered with respect to one another, whereby to direct liquid against imperforate ridge portions from the notch-provided outlets of the next inner groove-providing ridge.

6. The combination set forth in claim 1, and said notches of each ridge adding up to a fluid outlet capacity which is minor as compared to the fluid capacity of the related groove, and the notches of adjacent ridges being staggered with respect to one another, whereby to direct liquid against imperforate ridge portions from the notch-provided outlets of the next inner groove-providing ridge.

7. A homogenizer including in combination, a rotary head comprising concentric fixedly connected upper and lower discs, means for rotating said head, a rotary closed bowl connected to the lower disc, a central annular opening in the upper disc and the top of the bowl providing a central curved-wall-providing liquid-collecting chamber, one of said discs having a substantially plane surface, concentric radially spaced ridges projecting from the opposed surface of the other disc and making substantially liquid tight engagement with the plane surface of the first mentioned disc, whereby said discs provide concentric radially spaced grooves about said liquid-collecting chamber, said chamber having spaced radially extending outlet passages communicating with the innermost concentric groove provided by said discs, the inner walls of said groove-providing ridges slanting upwardly and outwardly toward the upper disc, means providing an annular acute-angle-defining fat globule-compressing or crushing space at the upper outer wall portions of said annular grooves, said ridges having circumferentially spaced notches cut in their upper ends, said notches being of minor depth as compared to the depth of said grooves and establishing communication from one groove to the next outer groove, the slanting inner walls of said groove-providing ridges directing the liquid upwardly to the plane of said notches, whereby to subject the liquid and its contents to extended frictional action against said walls while taking advantages of centrifugal action to prevent liquid from collecting in the bottom of said grooves.

8. The combination set forth in claim 7, and said notches of each ridge adding up to a fluid outlet capacity which is minor as compared to the fluid capacity of the related groove.

9. The combination set forth in claim 7, and the notches of adjacent ridges being staggered with respect to one another, whereby to direct liquid against imperforate ridge portions from the notch-provided outlets of the next inner groove-providing ridge.

10. The combination set forth in claim 7, and said notches of each ridge adding up to a fluid outlet capacity which is minor as compared to the fluid capacity of the related groove, and the notches of adjacent ridges being staggered with respect to one another, whereby to direct liquid against imperforate ridge portions from the notch-provided outlets of the next inner groove-providing ridge.

EUGENE H. REEB.

REFERENCES CITED

The following references are of record in the file of this patent:

UNITED STATES PATENTS

| Number | Name | Date |
| --- | --- | --- |
| 879,435 | Beach | Feb. 18, 1908 |
| 1,624,037 | Butler | Apr. 12, 1927 |
| 1,666,640 | Cunniff | Apr. 17, 1928 |
| 1,690,668 | China | Nov. 6, 1928 |
| 2,142,344 | Bowen | Jan. 3, 1939 |
| 2,388,573 | Rhodes | Nov. 6, 1945 |

FOREIGN PATENTS

| Number | Country | Date |
| --- | --- | --- |
| 113,336 | Austria | May 25, 1929 |